US006390731B1

(12) United States Patent
Van Gelder

(10) Patent No.: US 6,390,731 B1
(45) Date of Patent: *May 21, 2002

(54) APPARATUS FOR LAYING A PIPELINE IN DEEP WATER

(75) Inventor: Klaas Boudewijn Van Gelder, Delft (NL)

(73) Assignee: Allseas Group S.A. (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,547

(22) PCT Filed: Apr. 15, 1998

(86) PCT No.: PCT/NL98/00212

§ 371 Date: Dec. 16, 1998

§ 102(e) Date: Dec. 16, 1998

(87) PCT Pub. No.: WO98/46920

PCT Pub. Date: Oct. 22, 1998

(30) Foreign Application Priority Data

Apr. 16, 1997 (NL) .............................. 1005824

(51) Int. Cl.⁷ ................................. F16L 1/12

(52) U.S. Cl. ....................... 405/166; 405/171

(58) Field of Search ............... 405/166, 167, 405/169, 170, 171, 158, 184.4, 184.5

(56) References Cited

U.S. PATENT DOCUMENTS

| 3,431,739 | A | | 3/1969 | Richardson et al. ......... 61/72.3 |
| 3,690,111 | A | * | 9/1972 | Matthews, Jr. .............. 405/166 |
| 3,715,890 | A | * | 2/1973 | Langner ..................... 405/166 |
| 3,720,069 | A | * | 3/1973 | Lockridge ................... 405/166 |
| 3,739,591 | A | * | 6/1973 | Jones ........................ 405/166 |
| 3,756,034 | A | * | 9/1973 | Lochridge et al. .......... 405/167 |
| 3,822,558 | A | | 7/1974 | Blankenship et al. ........ 61/72.1 |
| 3,822,559 | A | | 7/1974 | Mathews et al. ............ 61/72.3 |
| 3,854,297 | A | * | 12/1974 | Broussard et al. .......... 405/167 |
| 4,257,718 | A | * | 3/1981 | Rosa et al. ................. 405/167 |
| 5,413,434 | A | * | 5/1995 | Stenfert et al. ............. 405/166 |

FOREIGN PATENT DOCUMENTS

| DE | 2358126 | * | 6/1974 | ................. 405/167 |
| DE | 2419560 | * | 11/1974 | ................. 405/167 |
| DE | 25 47 984 | | 4/1977 | |
| GB | 1307252 | * | 2/1973 | ................. 405/167 |
| GB | 2224803 | * | 5/1990 | ................. 405/166 |

* cited by examiner

Primary Examiner—Thomas B. Will
Assistant Examiner—Alexandra K. Pechhold
(74) Attorney, Agent, or Firm—Mark Zovko

(57) ABSTRACT

An apparatus for laying a pipeline (2) in water, comprising a vessel (1) with devices for assembling a pipeline from pipe parts, an elongate curved guide body (4) arrange on the hull of the vessel for guiding the pipeline from the vessel into the water, and a device (3) for carrying the guide body into respectively out of the water, wherein the elongate guide body is box-like, whereby a part of the forces exerted by the pipeline is absorbed by the guide track and the load on the hull is reduced.

3 Claims, 1 Drawing Sheet

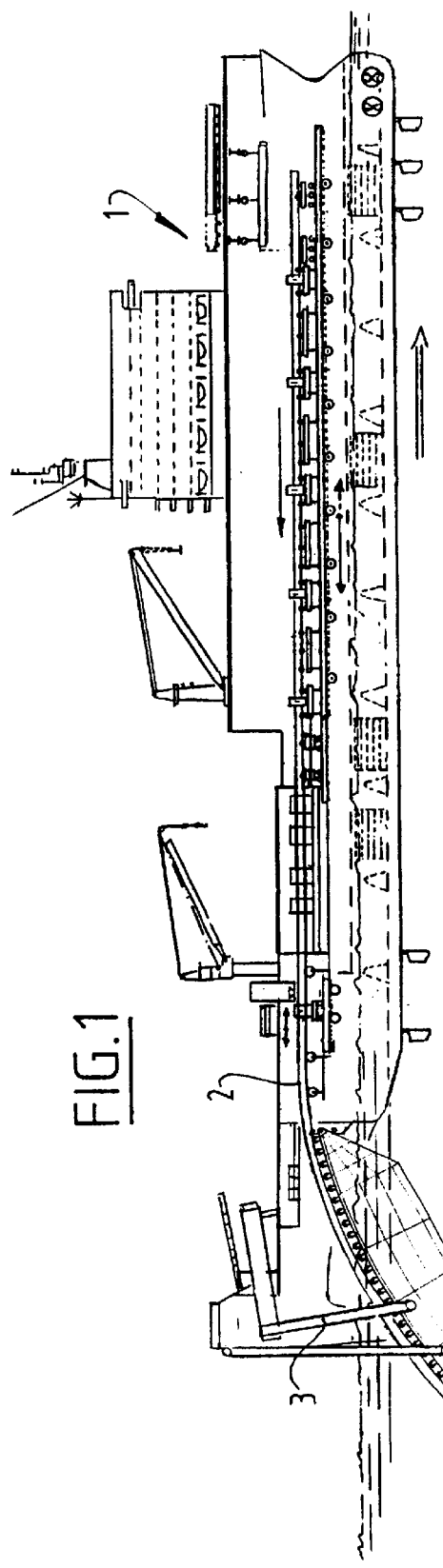
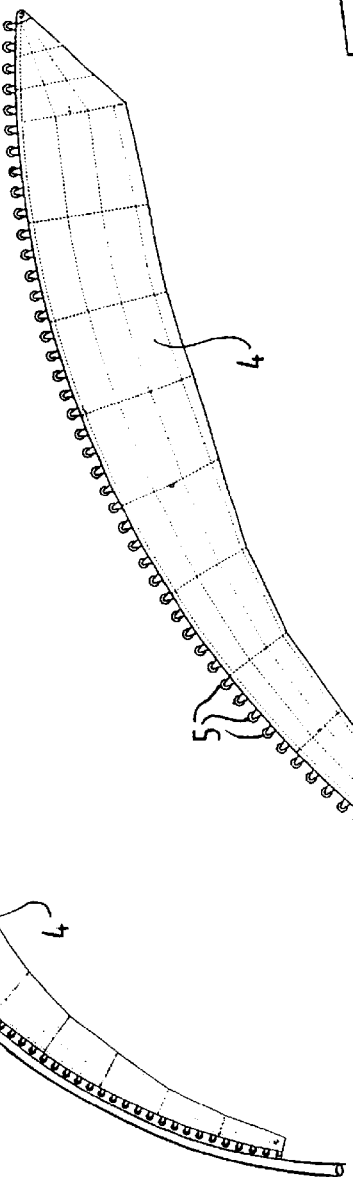
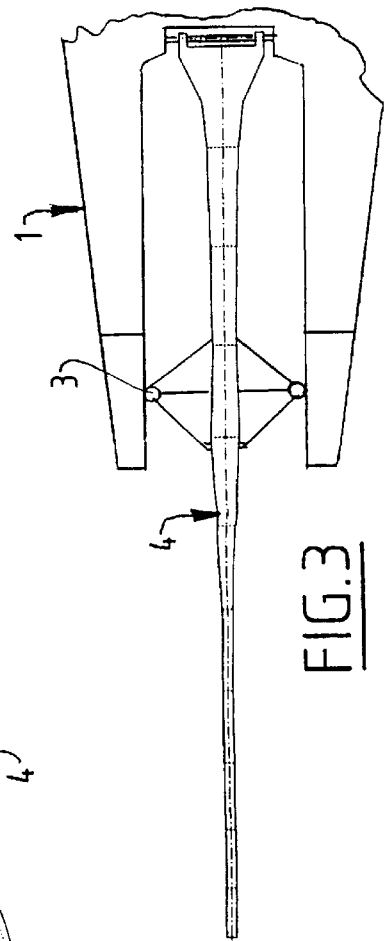
FIG.1
FIG.2
FIG.3

APPARATUS FOR LAYING A PIPELINE IN DEEP WATER

FIELD OF THE INVENTION

The invention relates to an apparatus for laying a pipeline in water, comprising a vessel with means for assembling a pipeline from pipe parts, an elongate curved guide body arranged on the hull of the vessel for guiding the pipeline from the vessel into the water, and means for carrying the guide body into respectively out of the water.

BACKGROUND OF THE INVENTION

Depending on the pipe diameter, such an apparatus is suitable for laying a pipeline to a certain depth, for instance about 1.5 km at a pipe diameter of 300 mm. When a pipeline is laid at greater depth with such an apparatus the loads on the hull become too great. These loads consist mainly of static vertical forces of the magnitude of the submerged weight of that part of the pipeline situated between the vessel and the bed of the water, and the dynamic forces which occur due to the swell of the waves. Already known is a body consisting of pivoting joints for the purpose of compensating the above forces, but it is not easily possible therein to properly control the bending radius of the pipeline at the position of the guide body, whereby, depending on the conditions, plastic deformation of the pipe occurs.

SUMMARY OF THE INVENTION

The object of the present invention is to provide an apparatus of the above described type wherein the above stated drawbacks are obviated.

The advantage of an apparatus according to the invention is that when the box-like body takes an air and watertight form the guide body acquires a buoyancy, whereby a part of the forces exerted by the pipeline is absorbed by the guide body and the load on the hull is reduced. The closed, fixed guide surface formed by the box form also better supports the pipeline lying on roller supports.

An embodiment according to the invention comprises a box-like body which in any cross-section has a small width relative to the height. The hydrodynamic forces are hereby minimal, while the box-like body is sufficiently strong to absorb the substantially vertical pipeline forces and vessel movements.

In a further embodiment according to the invention the guide body comprises a curved guide surface formed from pipe supporting elements, preferably rollers, which rollers are arranged at a mutual distance such that the greatest bending of the pipe takes place at the position of the rollers, wherein the bending is acceptable in terms of safety and design provisions.

A further embodiment according to the invention comprises a rod-like member which is arranged hingedly on the hull and carries the box-like body in respectively out of the water and which extends between a point on the vessel and a point on the box-like body at a distance from the hinge. This rod carries the box-like body out of the water in the case of bad weather conditions or in the case of transport, and carries the box-like body into the water for laying of a pipeline, wherein depending on the resultant force it exerts a tensile force or pressure force on the box-like body.

Another embodiment according to the invention comprises a box-like body in air and watertight form which is provided with one or more closed spaces for receiving ballast. It is hereby possible to regulate the excess or lack of buoyancy in particular cases by receiving for instance water in the spaces or pumping it therefrom.

Various aspects will be further elucidated with reference to the drawings of a preferred embodiment.

DESCRIPTION OF THE DRAWINGS

FIG. 1 shows a side view of a preferred embodiment according to the invention.

FIG. 2 shows a side view of the guide body of FIG. 1 on enlarged scale.

FIG. 3 shows a top view of the guide body of FIG. 1 on enlarged scale.

DESCRIPTION OF THE PREFERRED EMBODIMENTS

A preferred embodiment according to the invention comprises a ship 1 with means (not further shown) for assembling a pipeline 1 from pipe parts (see FIG. 1). Ship 1 is a vessel with a modified propelling and positioning device for correcting the position of the ship such that the pipeline can be laid with the correct precision in the water.

The assembled pipeline 2 is carried into the water from ship 1 via an elongate guide body 4 (FIG. 1). Guide body 4 is constructed in box shape and in airtight manner from a number of compartments, wherein in any cross-section the body has a small width relative to the height (see FIGS. 2 and 3). If the guide body is used in rough weather regions it is recommended to have the height decrease toward the free end.

The guide body is further arranged hingedly on the stern of the ship and connected at a distance from the hinge to a rod 3 for carrying thereof in respectively out of the water.

In a conventional apparatus for laying a pipeline the load is absorbed via the hull and the rod due to the weight of the depending pipe.

In the apparatus according to the invention the guide body 4 in airtight, box-like form has a buoyancy whereby a part of the load of the depending pipe is absorbed and it is now possible to take up a greater load, whereby a pipeline can be laid at greater depth than with the currently known apparatus.

On the top of guide body 4 are arranged a large number of rollers 5 for supporting and guiding pipeline 2. The rollers are adjustable in vertical direction and, if desired, resiliently yielding to allow passage of diameter differences of the pipe. In addition, they are placed at a mutual distance such that the maximum bending occurring at the position of the rollers is acceptable. A good control of the bending of the pipe is hereby obtained.

What is claimed is:

1. Apparatus for laying a pipeline in water, comprising a vessel with means for assembling a pipeline from pipe parts, an elongate curved guide body arranged on the hull of the vessel for guiding the pipeline from the vessel into the water, and means for carrying the guide body into and out of the water, characterized in that the elongate guide body is a single box-like guide body being airtight and watertight and having a forward, middle, and rearward portion, and wherein said box-like guide body comprises a hollow enclosed space divided into compartments thereby having buoyancy and the pipeline is supported from underneath by said box-like guide body, wherein the means for carrying the guide body into and out of the water comprises at least one rod-like member which carries said guide body in and out of the water and which extends between a point on the vessel and a point on said middle portion of said box-like guide body in order to fix the guide body relative to the vessel, wherein a plurality of the compartments of said box-like guide body have a height greater than the width of the compartments in cross section to support the pipeline as it is laid in the water.

2. The apparatus of claim 1 characterized in that the height of said box-like guide body varies along the length of said box-like guide body.

3. The apparatus of claim 1 characterized in that pipe support elements forming a curved guide surface are arranged on said box-like guide body.

* * * * *